May 24, 1932.  G. S. WEAVER  1,859,641
WINDSHIELD CLEANER
Filed Jan. 3, 1931
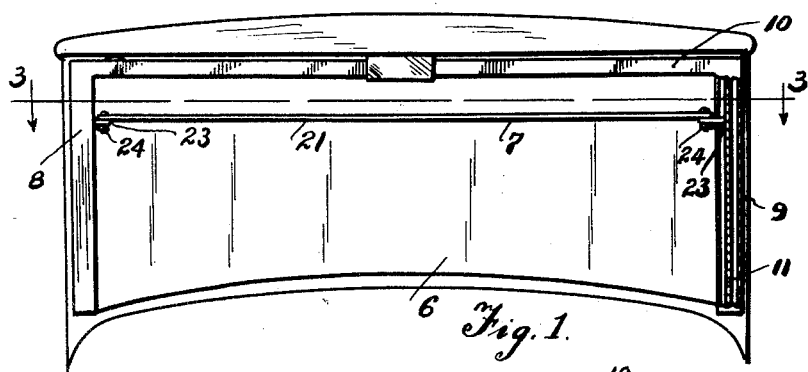
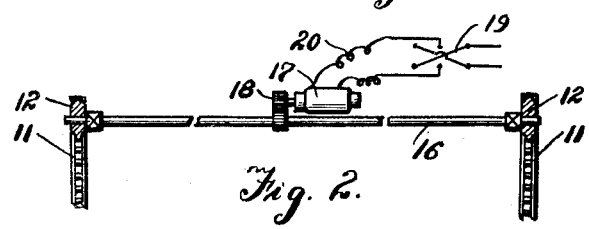
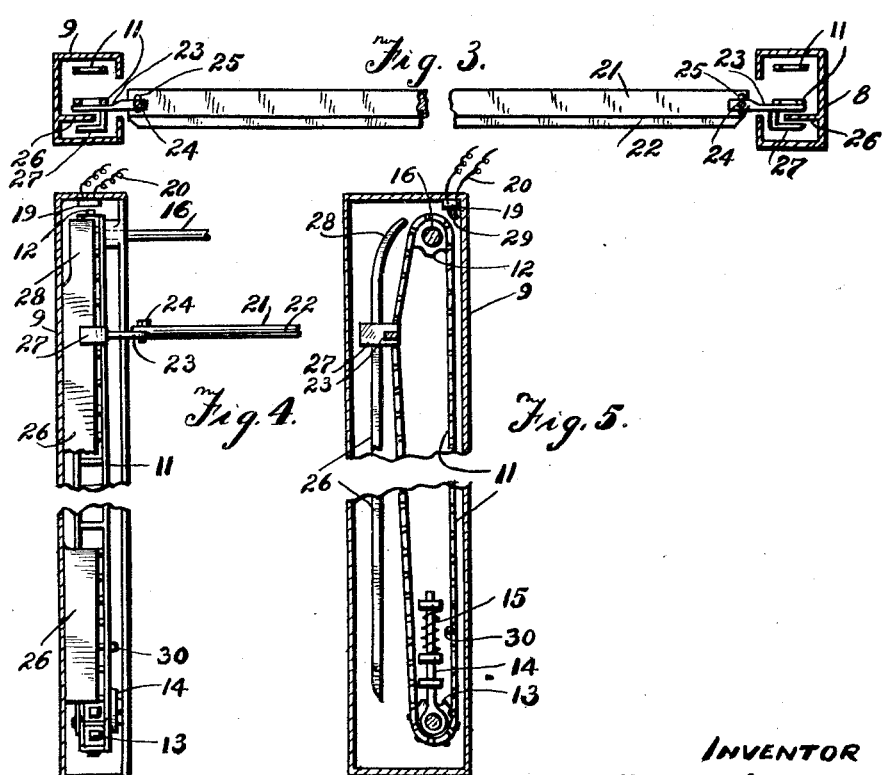
INVENTOR
Gordon Seymour Weaver
By Frederick C. Bromley
ATTORNEY Patented May 24, 1932

1,859,641

UNITED STATES PATENT OFFICE

GORDON SEYMOUR WEAVER, OF TORONTO, ONTARIO, CANADA

WINDSHIELD CLEANER

Application filed January 3, 1931, Serial No. 506,383, and in Canada January 4, 1930.

The invention relates to improvements in windshield cleaners as described in the present specification and shown in the accompanying drawings which form part of the same.

The invention has for its object the provision of a novel windshield cleaner designed to extend across the windshield and to downwardly wipe it during its working stroke so as to be assisted by gravitation and thus require less power to operate it with even greater efficiency than other known types.

A salient feature of the invention resides in its novel construction and arrangement whereby the wiper is abruptly thrown out of contact with the glass as it reaches the end of its downward stroke in order to shake off the accumulation of water or snow. The wiper is retained out of contact with the glass during its return stroke.

With these salient features in view, other features of invention will be disclosed as the description proceeds.

Referring to the drawings: Figure 1 is a front elevation of an automobile windshield depicting the invention applied thereto, which is shown partly in section.

Figure 2 is a detail illustrating the motor which drives this wiper connected to a transverse shaft for operating two endless chains.

Figure 3 is a transverse section of the invention taken on the line 3—3 of Figure 1.

Figure 4 is a sectional view through one of the uprights depicting the endless chain therein and its operating mechanism.

Figure 5 is a vertical section of the casing depicted in Figure 4 together with the mechanism shown in full.

Like numerals of reference indicate similar parts in each of the figures throughout the drawings.

In the drawings, the reference numeral 6 generally denotes the windshield glass of the car and 7 a transverse wiper horizontally extending thereacross.

8 and 9 are a pair of uprights in the form of hollow casings which are connected at their upper ends by means of a further casing 10. These casings contain the operating mechanism and are attached to the framework of the car in any suitable manner. This, of course, is immaterial to the invention.

In each of the casings 8 and 9 is a vertically disposed endless chain 11 fitted over the sprocket 12 at its upper end and over a sprocket 13 at its lower end. The lower sprocket is mounted in a tension device 14 having a spring 15 to provide the necessary tension for the chain. This tension device may be of any known construction and that shown in the drawings is given by way of example but not of limitation.

The sprockets 12 of each of the casings 8 and 9 are fixed upon a transverse shaft 16 suitably journalled in the casing 10, which casing also contains an electric motor 17 suitably connected to the shaft by means of interposed reduction gearing exemplified at 18. The motor is connected to a suitable source of power and has a reversing switch 19 in its circuit 20 for the purpose hereinafter to be explained. The wiper comprises a rigid metal blade 21 having the usual rubber strip 22 for contact with the glass. Each end of the blade is secured to a follower 23 borne by a link of the corresponding chain. The mode of attachment of the blade to the follower preferably comprises a bolt and nut 24 and a slot 25 by which the blade may be adjusted in its proximity to the glass.

Rigidly and vertically extending in each of the casings 8 and 9 on the inner side of the respective chain 11 is a guide 26 which is engaged by a bifurcation 27 of the follower 23 in the downward movement of the wiper. The guide extends the full length of the chain and has a flexible upper end 28 inwardly curved towards the sprocket 12 while the other end terminates abruptly in the vicinity of the lower sprocket 13. The reversing switch conventionally shown at 19 in Figure 2 is disposed in close proximity to the upper sprocket 12 and has a trip member 29 for engagement with the follower 23 and also by a projection 30 borne by one of the links of the chain.

In the operation of this invention, assuming the wiper blade 21 to be positioned at the top of the sprockets 12; upon energization of the motor the rotation of the shaft 16 operates the sprockets 12 so as to turn the chains 11 in a direction to feed the wiper blade downwardly upon the inner side of the sprockets. As the followers 23 move over the upper sprockets their bifurcations engage over the curved ends 28 of the guides 26, thus shifting the wiper into contact with the top of the windshield glass. As the movement continues the wiper downwardly sweeps the glass, being held in contact therewith by the engagement of the followers over the guides 26. Upon the followers arriving at the end of the guides they drop off abruptly, jarring the wiper blade sufficiently to shake off any accumulation of snow or ice. Immediately following this disengagement the projection 30 contacts with the trip 29 of the reversing switch and reverses the motor, thus causing the chain to travel in the opposite direction. In its return movement, the bifurcations 27 pass upwardly upon the inner side of the guides out of contact therewith, brushing past the yieldable upper ends 28 which flex sufficiently to allow the bifurcations to pass thereunder. Upon the followers arriving at the upper sprockets 12 they trip the reversing switch in order to reverse direction of movement again. In this way a recurrent cycle of operation takes place.

What I claim is:—

1. A windshield cleaner consisting of a shaft, driving means therefor, a pair of spaced sprockets fixed on said shaft, tensioning devices, a pair of sprockets mounted therein and aligned with the sprockets aforesaid, endless chains fitted on said sprockets, followers attached to opposite links of said chains, a wiper attached to said followers, rigid guides for engagement with said followers to advance the wiper into contact with the windshield during its working stroke, resilient forward ends projecting from the guides and inwardly curved to closely approach the forward sprockets, and mechanism for reversing the direction of rotation of aforesaid driving means at the end of the working stroke.

2. A windshield cleaner consisting of a shaft, driving means therefor, a pair of spaced sprockets fixed on said shaft, tensioning devices, a pair of sprockets mounted therein and aligned with the sprockets aforesaid, endless chains fitted on said sprockets, followers attached to opposite links of said chains, a wiper attached to said followers, rigid guides for engagement with said followers to advance the wiper into contact with the windshield during its working stroke, forward ends projecting from the guides and inwardly directed to closely approach the forward sprockets, said forward ends being adapted to yield outwardly from the forward sprockets, and mechanism for reversing the direction of rotation of aforesaid driving means at the end of the working stroke.

3. A windshield cleaner consisting of a shaft, a reversing electric motor geared thereto, a pair of spaced sprockets fixed on said shaft, tensioning devices, a pair of sprockets mounted therein and aligned with the sprockets aforesaid, endless chains fitted on said sprockets, followers attached to opposite links of said chains, a wiper attached to said followers, rigid guides for engagement with said followers to advance the wiper into contact with the windshield during its working stroke, resilient forward ends projecting from the guides and inwardly curved to closely approach the forward sprockets, a reversing switch electrically connected in the motor circuit, and means borne by the chains for tripping the switch at each end of the working stroke.

Signed at Toronto, Ontario, Canada, this 30th day of December, 1930.

GORDON SEYMOUR WEAVER.